United States Patent [19]

Hoffmann

[11] 4,439,288

[45] Mar. 27, 1984

[54] PROCESS FOR REDUCING ZN CONSUMPTION IN ZINC ELECTROLYTE PURIFICATION

[75] Inventor: James E. Hoffmann, Houston, Tex.

[73] Assignee: Exxon Research & Engineering Company, Florham Park, N.J.

[21] Appl. No.: 512,453

[22] Filed: Jul. 11, 1983

[51] Int. Cl.$^3$ .................. C23B 5/10; C25B 11/03
[52] U.S. Cl. ..................... 204/114; 204/119
[58] Field of Search .................. 204/114, 119

[56] References Cited

U.S. PATENT DOCUMENTS

| | | | |
|---|---|---|---|
| 1,283,077 | 10/1918 | Clevenger | 204/119 |
| 1,969,567 | 8/1934 | Lee | 204/119 |
| 3,649,180 | 3/1972 | McKay et al. | 204/114 |
| 3,655,538 | 4/1972 | Renken et al. | 204/114 |
| 3,758,386 | 9/1973 | Chan | 204/119 |
| 4,239,737 | 12/1980 | Ermini | 423/241 |
| 4,364,807 | 12/1982 | Röpentck et al. | 204/114 |
| 4,379,037 | 4/1983 | Bolton et al. | 204/119 |

FOREIGN PATENT DOCUMENTS 1120423  3/1982  Canada ........................... 204/114

OTHER PUBLICATIONS

Partington, *Textbook of Inorganic Chemistry*, 6th Edition, 1950, p. 467.

*Primary Examiner*—Arthur P. Demers
*Attorney, Agent, or Firm*—Joseph J. Dvorak

[57] ABSTRACT

The present invention contemplates treating a zinc sulfate containing solution, especially a neutral leach filtrate with a reducing agent selected from $ZnSO_3$, $SO_2$ or mixtures thereof to substantially reduce the oxidant therein and to obtain a solution having a predetermined pH. Thus, in one embodiment of the present invention, a neutral leach filtrate containing an oxidant selected from permanganate and manganate ions and mixtures thereof is treated with a reducing agent selected from $ZnSO_3$, $SO_2$ or mixtures thereof in amounts sufficient to substantially reduce all the manganese ions present (permanganate and/or manganate) to the divalent state and to provide a zinc sulfate solution for electrodeposition of the zinc having a predetermined pH.

8 Claims, 1 Drawing Figure

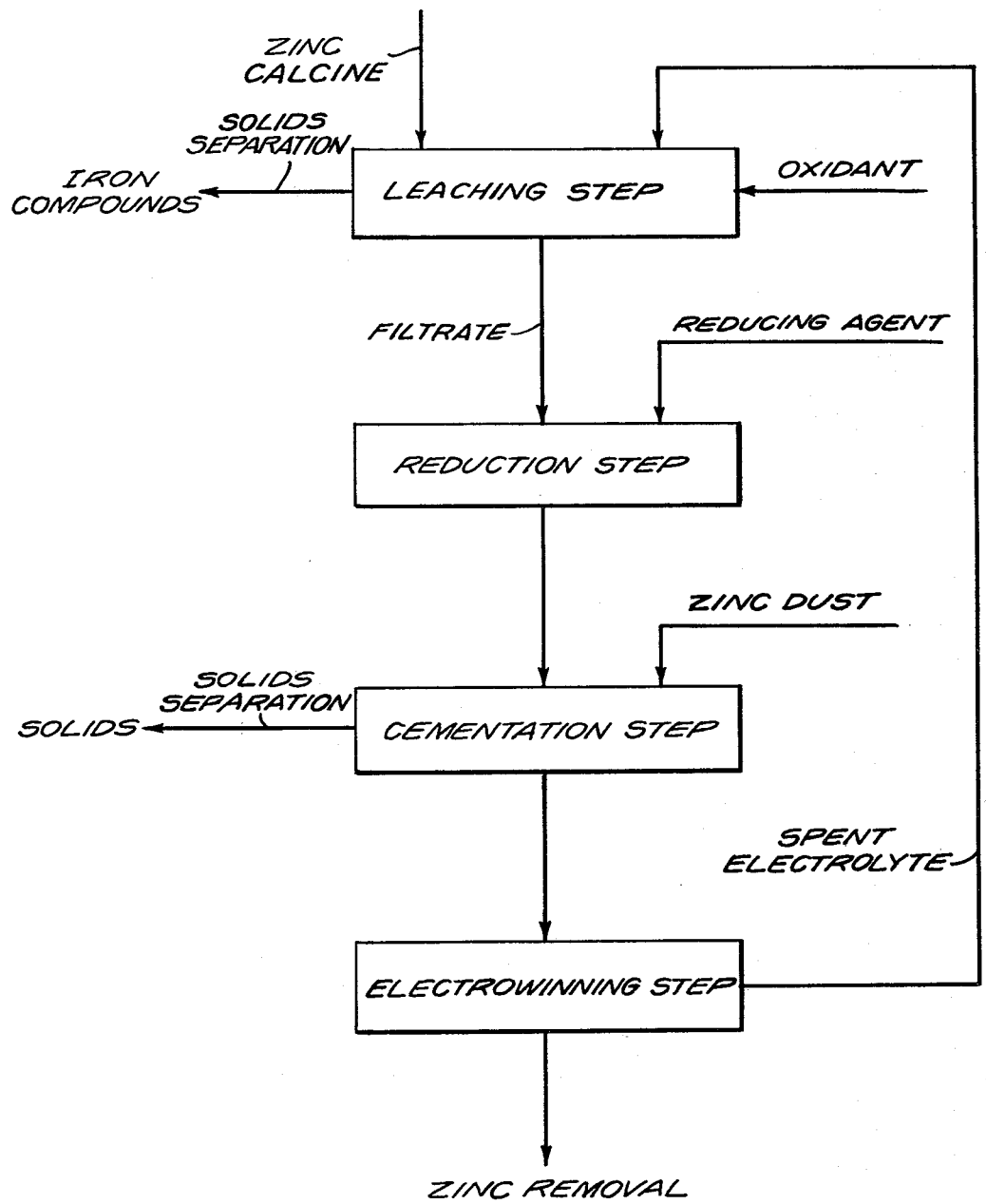

PROCESS FOR REDUCING ZN CONSUMPTION IN ZINC ELECTROLYTE PURIFICATION

FIELD OF THE INVENTION

This invention relates to the electrolytic production of zinc from zinc sulfate solutions obtained by leaching zinc ores, zinc concentrates, zinc calcines or other zinc containing material. More particularly, the present invention relates to the treatment prior to zinc dust purification of zinc sulfate leachates containing permanganate or manganate ions.

BACKGROUND OF THE INVENTION

In the conventional zinc electrowinning process, calcined zinc concentrates are leached with spent (zinc depleted) electrolyte recycled from the electrowinning operation. The acidity of this return liquor, which ranges from about 100 to about 225 g/l $H_2SO_4$) is such that some of the iron present in the zinc-bearing calcine dissolves along with the zinc. As the leach proceeds, the acid in the return liquor is gradually consumed and the pH rises to a terminal value generally between pH 4 and pH 6. This leaching operation is referred to as the "neutral leach" and the filtrate after the solids/liquids separation is the neutral leach filtrate.

Iron which initially dissolved, if present, in the trivalent oxidation state, becomes insoluble at about pH 3 and precipitates from solution. The iron precipitate forms voluminous gelatinous flocs which occlude highly deleterious insoluble impurities, such as antimony, arsenic or germanium and ensure their removal from solution. This function of iron is so important that additional iron salts are added to the solution if an insufficient amount is provided by the calcine. On the other hand, divalent (ferrous) iron is soluble under the processing conditions; consequently, it is imperative that all the dissolved and added iron be oxidized to the trivalent form prior to the solid/liquids separation otherwise the divalent iron will not be removed in the subsequent purification steps and will remain in the solution sent to the electrowinning operation. There the iron will contaminate the zinc metal product and increase energy consumption.

It is common practice to oxidize the iron present in the leach solution by the addition of an excess of a strong oxidant such as permanganate ions or manganese dioxide. The soluble excess oxidant, particularly the permanganate ion, however, consumes zinc dust during the subsequent purification step in which zinc dust is added to cement more noble impurities. The overall reaction is shown in Equation 1 below.

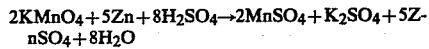  Eq. 1

As will be readily appreciated from Equation 1, for every gram of permanganate ion in solution 1.374 grams of zinc dust are consumed. This amount of zinc dust is equivalent to about 1% of the zinc production in the system and represents a significant production cost.

SUMMARY OF THE INVENTION

Simply stated, the present invention contemplates treating a zinc sulfate containing solution, especially a neutral leach filtrate, with a reducing agent selected from $ZnSO_3$, $SO_2$ or mixtures thereof to substantially reduce the oxidant therein and to obtain a solution having a predetermined pH. Thus, in one embodiment of the present invention, a neutral leach filtrate containing an oxidant selected from permanganate and manganate ions and mixtures thereof is treated with a reducing agent selected from $ZnSO_3$, $SO_2$ or mixtures thereof in amounts sufficient to substantially reduce all the manganese ions present (permanganate and/or manganate) to the divalent state and to provide a zinc sulfate solution for electrodeposition of the zinc having a predetermined pH.

BRIEF DESCRIPTION OF THE DRAWING

The FIGURE which is attached is a flow sheet illustrating the present invention.

DETAILED DESCRIPTION

The process of the present invention will be described with particular reference to the accompanying flow sheet which diagrammatically represents the primary treatment step of the present invention in relation to the overall process of electrowinning of zinc from zinc sulfate solutions.

In the electrowinning of zinc, spent electrolyte from the electrowinning step which generally has an acidity of from 100 to 225 g/l $H_2SO_4$ and generally from 150 to 200 g/l $H_2SO_4$ is employed in leaching zinc values from zinc calcines. Typically, a series of reactors are used in the leaching step to provide sufficient reaction time and prevent back mixing. A single reactor, however, may be employed for leaching if so desired. In any event, after leaching of the zinc calcine with spent electrolyte, an oxidizing agent such as $KMnO_4$ or $MnO_2$ or mixtures thereof is added to the mixture. The amount of oxidizing agent employed typically is in excess of that required to complete the oxidation of divalent iron that is present in the leachate.

After oxidation of the divalent iron, the insoluble iron compounds and other insoluble material are removed, for example, by filtration, to provide a neutral leach filtrate. This neutral leach filtrate is then treated in a reducing step in accordance with the present invention. Accordingly, the neutral leach filtrate containing the zinc sulfate and excess oxidant is treated with a reducing agent selected from $ZnSO_3$, $SO_2$ or mixtures thereof in amounts sufficient to reduce substantially all oxidant present and to provide a predetermined pH of the reduced solution. For example, if the oxidant is $KMnO_4$ and the reducing agent is $SO_2$, all of the $KMnO_4$ present in the neutral leach filtrate will be reduced with the generation of sulfuric acid as shown in Equation 2 below. This reaction is chosen should it be desired to provide a solution with a low pH.

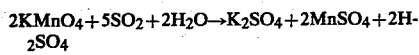  Eq. 2

Alternatively, the reducing agent may be zinc sulfite as shown in Equation 3 below.

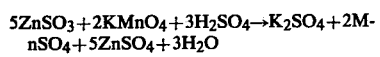  Eq. 3

As can be seen from Equation 3, reduction of the permanganate ion is achieved without generating acidity and can, in fact, be usefully employed to reduce the acidity of the solution, if so desired. This procedure is of particular utility since sulfuric acid present will otherwise react with the zinc dust used in the cementation step via the reaction shown in Equation 4.

$$Zn + H_2SO_4 \rightarrow ZnSO_4 + H_2 \qquad \text{Eq. 4}$$

In a particularly preferred embodiment of the present invention, a mixture of zinc sulfite and $SO_2$ are employed as shown in Equation 5 below.

$$2ZnSO_3 + 3SO_2 + 2KMnO_4 \rightarrow K_2SO_4 + 2MnSO_4 + 2ZnSO_4 \qquad \text{Eq. 5}$$

As can be seen from Equation 5, it is possible to reduce the permanganate ion without net consumption or generation of $H_2SO_4$.

From the foregoing, it should be apparent that by varying the ratio of $ZnSO_3$ to $SO_2$, one can reduce the oxidant, such as manganate and/or permanganate ions present in the neutral leach filtrate solution and obtain a leach filtrate having predetermined pH. In general, the ratio of $ZnSO_3$ to $SO_2$ to be employed will depend upon local operating conditions. For example, employing $SO_2$ as the reducing agent is particularly well suited to zinc refineries where a plentiful supply of $SO_2$ is assured from the roasting of zinc concentrates. Alternatively, of course, zinc sulfite can be prepared conveniently by sparging an aqueous slurry of zinc oxide with $SO_2$ as shown in Equation 6 below should there exist a preference to use zinc sulfite as the reductant in practicing the present invention.

$$ZnO + SO_2 \rightarrow ZnSO_3 \qquad \text{Eq. 6}$$

In any event, after reducing the permanganate present in the oxidized leach filtrate in accordance with the practice of the present invention, the now reduced leached solution can be treated with zinc dust in a cementation step so as to remove metallic impurities more noble than zinc. These metallic impurities will be removed as solids and the resultant purified zinc sulfate solution will be passed to the electrowinning step for further treatment.

As will be readily appreciated, the removal of oxidant such as manganate and permanganate ions from the neutral leach filtrate in accordance with the practice of the present invention decreases the amount of zinc that is consumed in the cementation step and consequently provides an overall improvement in the production of zinc.

What is claimed is:

1. In the purification of neutral leach filtrates containing oxidants for the electrowinning of zinc, the improvement comprising:
    treating the neutral leach filtrate with a reducing agent selected from $ZnSO_3$, $SO_2$ or mixtures thereof in amounts sufficient to substantially reduce all the oxidant present in the neutral leach filtrate and to provide a treated zinc leachate having a predetermined pH.

2. The method of claim 1 wherein said reducing agent is $ZnSO_3$.

3. The method of claim 1 wherein the reducing agent is $SO_2$.

4. The method of claim 1 wherein the reducing agent is a mixture of $ZnSO_3$ and $SO_2$.

5. In the method of electrodepositing zinc from solutions obtained by oxidizing a zinc leachate with an oxidant selected from $MnO_2$, $KMnO_4$ or mixtures thereof and subsequently treating the oxidized solution with zinc dust to obtain a purified zinc sulfate solution, the improvement comprising:
    adding a reducing agent to the oxidized zinc leachate, said reducing agent being selected from the group consisting of $ZnSO_3$, $SO_2$ and mixtures thereof, said reducing agent being added in amounts sufficient to reduce substantially all of the manganese present in said oxidized leachate to the divalent form, whereby the amount of zinc dust required to obtain said purified zinc sulfate solution is substantially reduced.

6. A process for the recovery of zinc from zinc containing materials such as zinc ores, concentrates and calcines comprising:
    leaching a zinc containing material with a sulfuric acid containing solution whereby zinc, iron and other metals in said material are dissolved in said solution;
    adding an oxidant selected from $MnO_2$, $KMnO_4$ and mixtures thereof to said solution in amounts in excess of that required to oxidize divalent iron dissolved in said solution to the trivalent state;
    separating the solids from said solution whereby a neutral leach filtrate is obtained;
    adding a reducing agent to the neutral leach filtrate, said reducing agent being selected from the group consisting of $ZnSO_3$, $SO_2$ and mixtures thereof, said reducing agent being added in amounts sufficient to reduce substantially all the manganese ions present in said leachate to the divalent form;
    treating said reduced solution with zinc dust in amounts sufficient to cement metals more noble than zinc from said solution;
    separating said cemented metals from said solution whereby a purified zinc containing solution is obtained; and
    recovering zinc from purified solution.

7. The process of claim 6 wherein said zinc is recovered by electrowinning and a sulfuric acid containing solution is obtained.

8. The process of claim 7 including recycling said sulfuric acid containing solution obtained from electrowinning said zinc to leach said zinc containing materials.

* * * * *